United States Patent [19]
Sulzbach et al.

[11] Patent Number: 6,036,898
[45] Date of Patent: Mar. 14, 2000

[54] PROCESS FOR THE CONTINUOUS PRODUCTION OF POLYURETHANE SLABSTOCK FOAM

[75] Inventors: Hans-Michael Sulzbach; Herbert Steilen, both of Königswinter, Germany

[73] Assignee: Hennecke GmbH, Leverkusen, Germany

[21] Appl. No.: 09/008,003

[22] Filed: Jan. 16, 1998

[30] Foreign Application Priority Data

Jan. 24, 1997 [DE] Germany .................. 197 02 433

[51] Int. Cl.[7] .................. B29C 44/20; B29C 44/46
[52] U.S. Cl. .................. 264/51; 264/45.8; 264/338
[58] Field of Search .................. 264/45.8, 46.2, 264/338, DIG. 77, 51; 425/817 C, 4 C

[56] References Cited

U.S. PATENT DOCUMENTS

| | | | |
|---|---|---|---|
| 2,931,063 | 4/1960 | Harris | 264/46.2 |
| 3,644,606 | 2/1972 | Auge et al. | 264/46.2 |
| 3,775,522 | 11/1973 | Auge | 264/46.2 |
| 4,108,585 | 8/1978 | Proksa et al. | 425/89 |
| 4,128,611 | 12/1978 | Kilakowski et al. | 264/46.2 |
| 4,347,281 | 8/1982 | Futcher et al. | 264/46.2 |
| 4,495,013 | 1/1985 | Walker et al. | 156/79 |
| 5,665,286 | 9/1997 | Sulzbach et al. | 264/46.2 |

FOREIGN PATENT DOCUMENTS

| | | |
|---|---|---|
| 769359 | 4/1997 | European Pat. Off. . |
| 1778946 | 12/1971 | Germany . |
| 53-8666 | 1/1978 | Japan .................. 264/46.2 |
| 96/16782 | 6/1996 | WIPO . |

*Primary Examiner*—Allan R. Kuhns
*Attorney, Agent, or Firm*—Joseph C. Gil; Noland J. Cheung

[57] ABSTRACT

A process and apparatus are described for the continuous production of polyurethane slabstock foam by applying a polyurethane reactive mixture in the form of a liquid foam from a substantially punctual source onto the conveyor belt of a slabstock foam plant and distributing the liquid foam transversely across the width of the conveyor belt by means of a distribution device arranged above the conveyor belt, to form a distribution slot, wherein the distribution device is in the form of a stationary plate.

5 Claims, 4 Drawing Sheets

PROCESS FOR THE CONTINUOUS PRODUCTION OF POLYURETHANE SLABSTOCK FOAM

FIELD OF THE INVENTION

The present invention relates to a process for the continuous production of polyurethane slabstock foam by applying a polyurethane reactive mixture in the form of a liquid foam from a substantially punctually or rotationally symmetrical source onto the conveyor belt of a slabstock foam plant and distributing the liquid foam transversely across the width of the conveyor belt by means of a distribution device arranged above the conveyor belt.

BACKGROUND OF THE INVENTION

A process for the continuous production of polyurethane slabstock foam by applying a polyurethane reactive mixture in the form of a liquid foam from a substantially punctually or rotationally symmetrical source onto the conveyor belt of a slabstock foam plant is disclosed, for example, in WO 96/16782 and in European patent application 96 116 053.8, which is not a prior publication, or German application 19 627 065.0, wherein a polyurethane reactive mixture containing carbon dioxide dissolved under pressure is decompressed to form a liquid foam and is applied onto the conveyor belt of a slabstock foam plant. The conveyor belt may have a width of 2.2 m or greater.

One problem with such a process is the transverse distribution of the liquid foam (froth) over the width of the conveyor belt.

In order to solve this problem, European patent application 95 109 419.2 proposed providing a deflector for feeding the upper laminating film flat, resulting in the formation, between the upper and lower laminating film, of a channel having a substantially constant cross-section, in which, before entering the channel, the liquid foam accumulates and is distributed across the width of the conveyor belt. See also EP-A 21,564 which shows a channel with a narrowing cross-section.

Adhesion and curing of the polyurethane reactive mixture on the transverse distributor element is avoided by performing the transverse distribution using the upper laminating film because the surface of the transverse distributor element is constantly renewed. Furthermore, the motion of the lower and upper laminating films in the same direction promotes the drawing in of the froth into the channel, thus, making a substantial contribution to the transverse distribution within the channel. This counteracts any "ageing" of the froth in the accumulated material upstream from the channel.

An unsatisfactory feature of this solution is the requirement of using an upper laminating film or at least a circulating film, from which any adhering polyurethane must be removed. This problem may partly be reduced by using foils having a layer of polyethylene, silicone or similar material as proposed according to DE-A 1778946.

SUMMARY OF THE INVENTION

The present invention claims a process for the continuous production of polyurethane slabstock foam comprising the step of applying a polyurethane reactive mixture in the form of a liquid foam from a substantially rotationally symmetrical source onto the conveyor belt of a slabstock foam plant and distributing the liquid foam transversely across the width of the conveyor belt by a distribution device arranged above the conveyor belt, thereby forming a distribution slot, wherein said distribution device is in the form of a plate, the surface of said plate comprising a material which has self-releasing properties towards the polyurethane reactive mixture, wherein said plate is arranged obliquely at an angle of 20 to 60° relative to the conveyor belt center line. An apparatus utilizing such a process is also claimed.

DETAILED DESCRIPTION OF THE INVENTION

Figure 1:
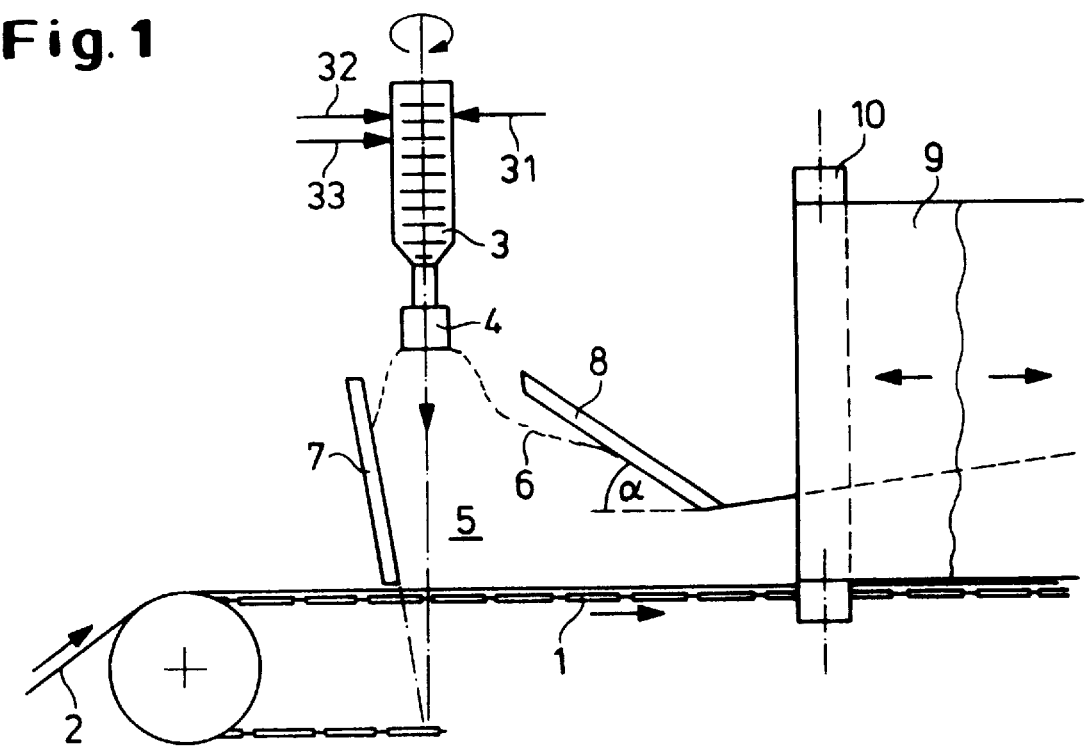
FIG. 1 shows a side view of the apparatus of the present invention

Contrary to the expectations of the person skilled in the art, it has now been found that transverse distribution of the froth may be achieved by means of a simple, stationary plate extending transversely across the conveyor belt. The plate of the present invention is arranged obliquely relative to the conveyor belt such that a tapering channel is formed, without any disruptive adhesions being formed on the plate. The surface of the plate consists of a material, such as polyethylene or polytetrafluoroethylene, which is not readily wetted by the reactive mixture. This finding is contrary to experience with polyurethane reactive mixtures which have not been prefoamed. Even on self-releasing materials, these mixtures form adhesions within a few minutes, which, once present, grow very rapidly.

Furthermore, it has been found that the absence of the drawing-in action of the stationary plate does not result in a disadvantageous age distribution due to accumulation upstream from the plate provided that the angle of the plate relative to the lower conveyor belt is adjusted between 20 and 60°.

Accordingly, the present invention provides a process for the continuous production of polyurethane slabstock foam by applying a polyurethane reactive mixture in the form of a liquid foam from a substantially punctual source onto the conveyor belt of a slabstock foam plant. The liquid foam is distributed transversely across the width of the conveyor belt by means of a distribution device arranged above the conveyor belt, thereby forming a distribution slot. The distribution device is in the form of a plate, the surface of the plate comprising a material which has self-releasing properties towards the polyurethane reactive mixture. In the present invention, the plate is arranged obliquely at an angle of 20 to 60° relative to the conveyor belt center line.

The present invention also provides an apparatus for the continuous production of polyurethane slabstock foam in a known slabstock foam plant. The plant contains a substantially punctual feed device for polyurethane reactive mixture liquid foam arranged above the conveyor belt and a device, which forms a distribution slot with the conveyor belt, to distribute the liquid foam transversely across the width of the conveyor belt, wherein the distribution device is in the form of a plate, the surface of which comprises a material having self-releasing properties towards the polyurethane reactive mixture, wherein the plate is adjusted obliquely at an angle of 20 to 60° relative to the conveyor belt center line.

It is not necessary for the plate forming the distribution device to be a flat plate. It may, for example, be curved in the direction of the conveyor belt.

Another embodiment of the present invention comprises in making the transverse distribution element wedge-shaped so that the accumulated material slides out towards the edge of the conveyor belt on the wedge-shaped transverse distribution element.

Accordingly, the present invention also provides a process for the continuous production of polyurethane slabstock foam by applying a polyurethane reactive mixture in the form of a liquid foam from a substantially punctual source onto the conveyor belt of a slabstock foam plant and distributing the liquid foam transversely across the width of the conveyor belt by means of a device forming a distribution slot therewith. The distribution device is wedge-shaped on the feed side of the liquid foam, wherein the ridge of the wedge extends in the central plane of the conveyor belt and, in the direction of the conveyor belt, converges therewith.

The present invention also provides an apparatus for the continuous production of polyurethane slabstock foam in a known slabstock foam plant, wherein the plant contains a substantially punctual feed device for polyurethane reactive mixture liquid foam arranged above the conveyor belt and a device, which forms a distribution slot with the conveyor belt, to distribute the liquid foam transversely across the width of the conveyor belt, wherein the distribution device is wedge-shaped on the feed side of the liquid foam, wherein the ridge of the wedge extends in the central plane of the conveyor belt, converging therewith in the direction of the conveyor belt.

The transverse distribution device may comprise an appropriately shaped plate which is coated with a polyethylene or polytetrafluoroethylene film and is not wettable by the polyurethane liquid foam. The self-releasing film is preferably tensioned over the transverse distribution element with appropriately tensioning elements, such that the film may be replaced during plant shut-downs.

The transverse distribution element may be a bent plate, wherein the apex of the angle forms the ridge of the wedge. The dihedral angle of the wedge is preferably 120 to 1500. The ridge of the wedge preferably forms an angle of 40 to 60° with the conveyor belt center line.

The invention is illustrated in greater detail below by means of the attached FIGS. 1 to 3:

FIG. 1 shows the conveyor belt 1 of a slabstock foam plant. The lower laminating film 2 is applied onto the conveyor belt. Above the conveyor belt is located the mixing head 3, into which the polyisocyanate, polyol and optionally, further additives and auxiliary substances may be introduced via lines 31, 32 and 33. The blowing gas, in particular $CO_2$ is dissolved in the polyol component. The polyurethane reactive mixture leaves the mixing head 3 via the decompression unit 4, in which the reactive mixture is pressed through one or more screens in the form of a liquid foam, which is indicated by the contour line 6. A stationary plate 7 prevents the foam from flowing back contrary to the conveying direction of the conveyor belt 1. Lateral laminating films 9 are also fed via deflection rollers 10. A plate-shaped transverse distribution element 8 is now provided according to the present invention, wherein the plate 8, which extends transversely across the conveyor belt, forms an angle a of preferably 20 to 45° to a parallel line relative to the conveyor belt center line.

Figure 2:
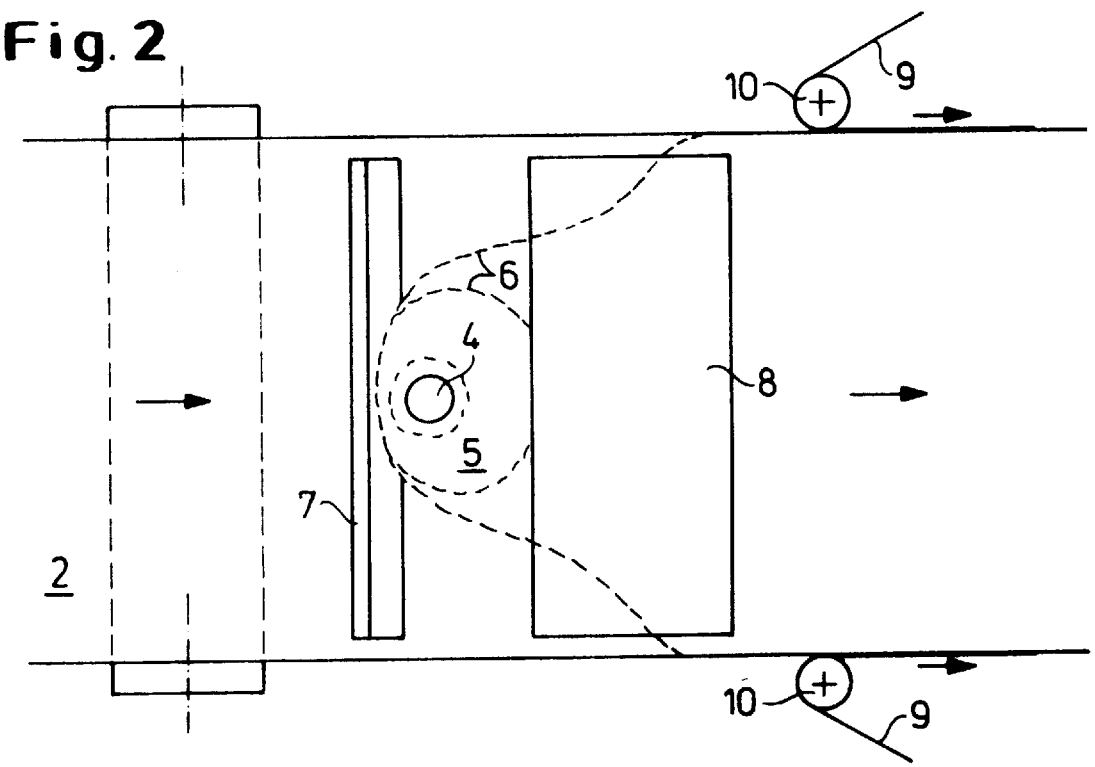
FIG. 2 shows a top view of the apparatus shown in FIG. 1.

FIG. 2 shows a top view of the apparatus according to FIG. 1. The same reference numbers denote the same elements.

Figure 3:
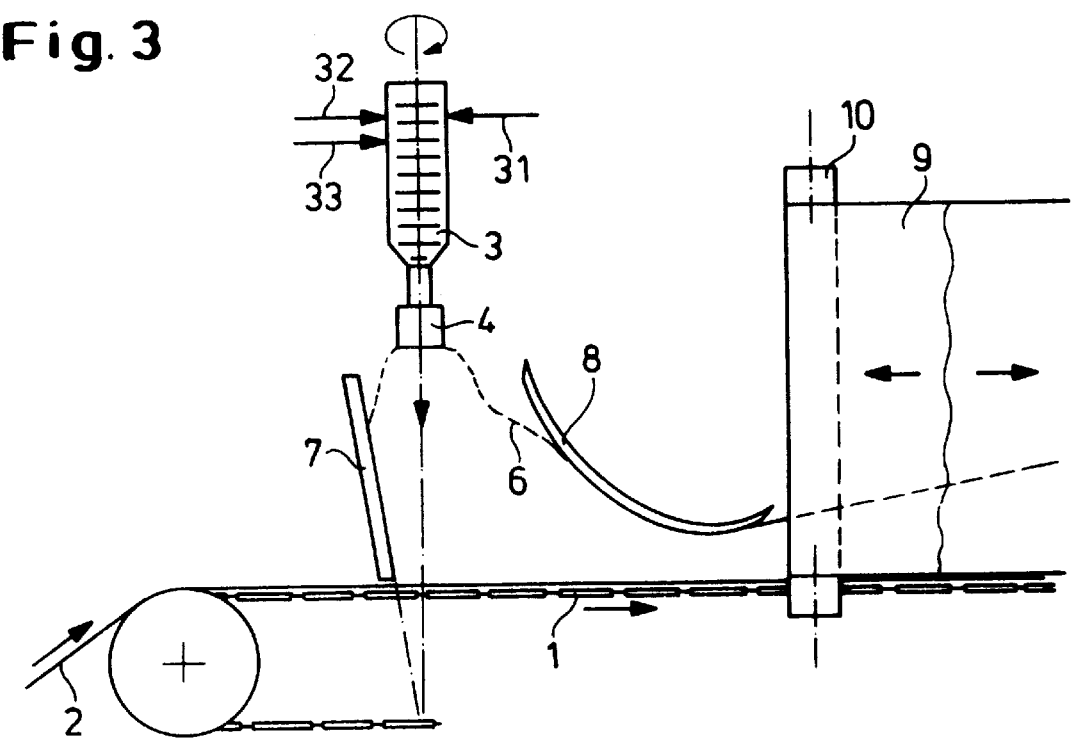
FIG. 3 shows a side view of the present invention wherein the plate is curved in the direction of the conveyor belt.
Figure 4:
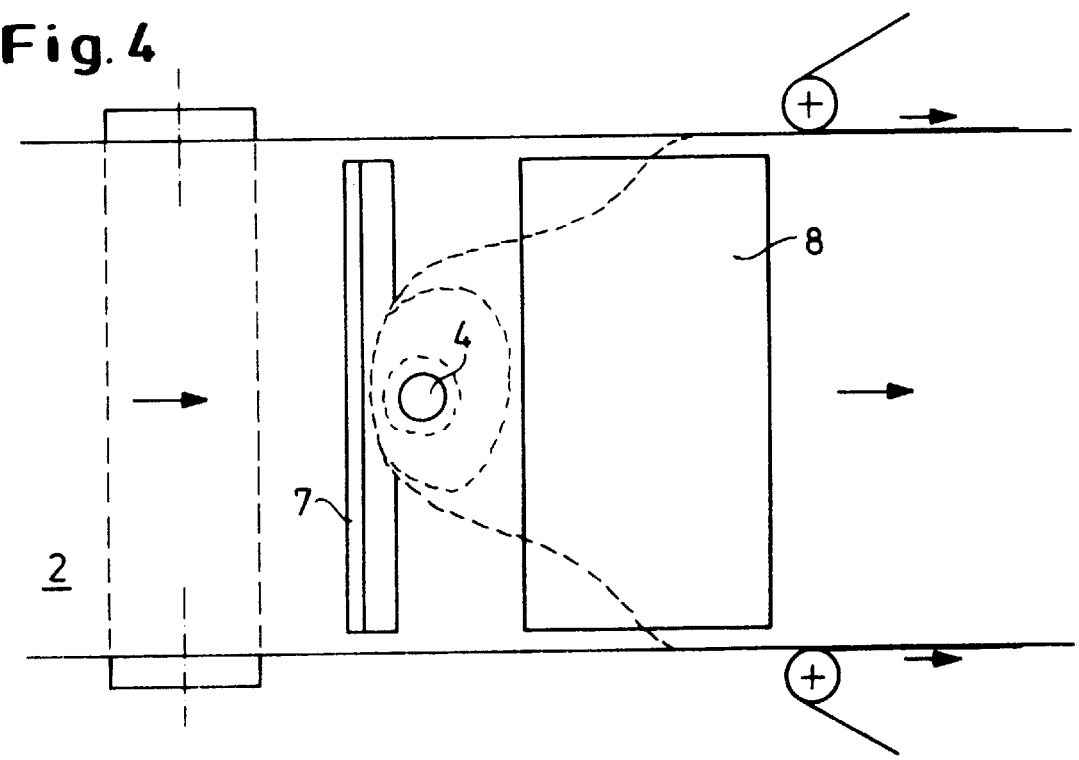
FIG. 4 shows a top view of the apparatus of FIG. 3.

FIGS. 3 and 4 show representations corresponding to FIGS. 1 and 2, wherein the plate 8 is curved in the direction of the conveyor belt.

Figure 5:
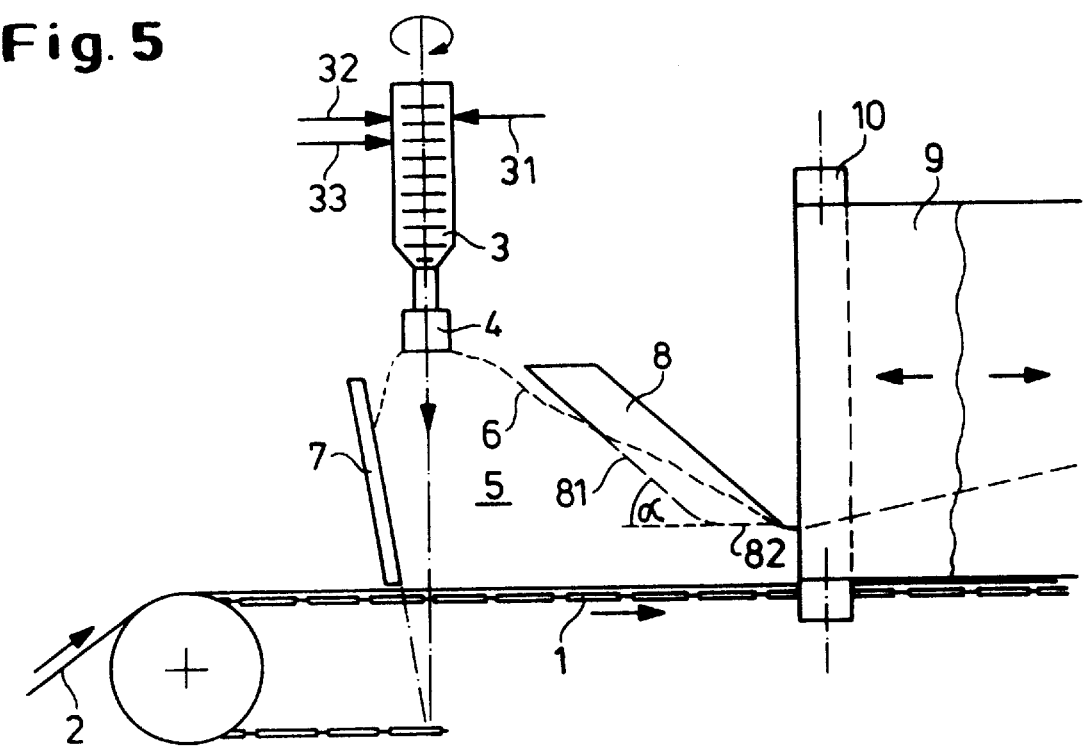
FIG. 5 shows a side view of the present invention wherein the distribution device is wedge-shaped.
Figure 6:
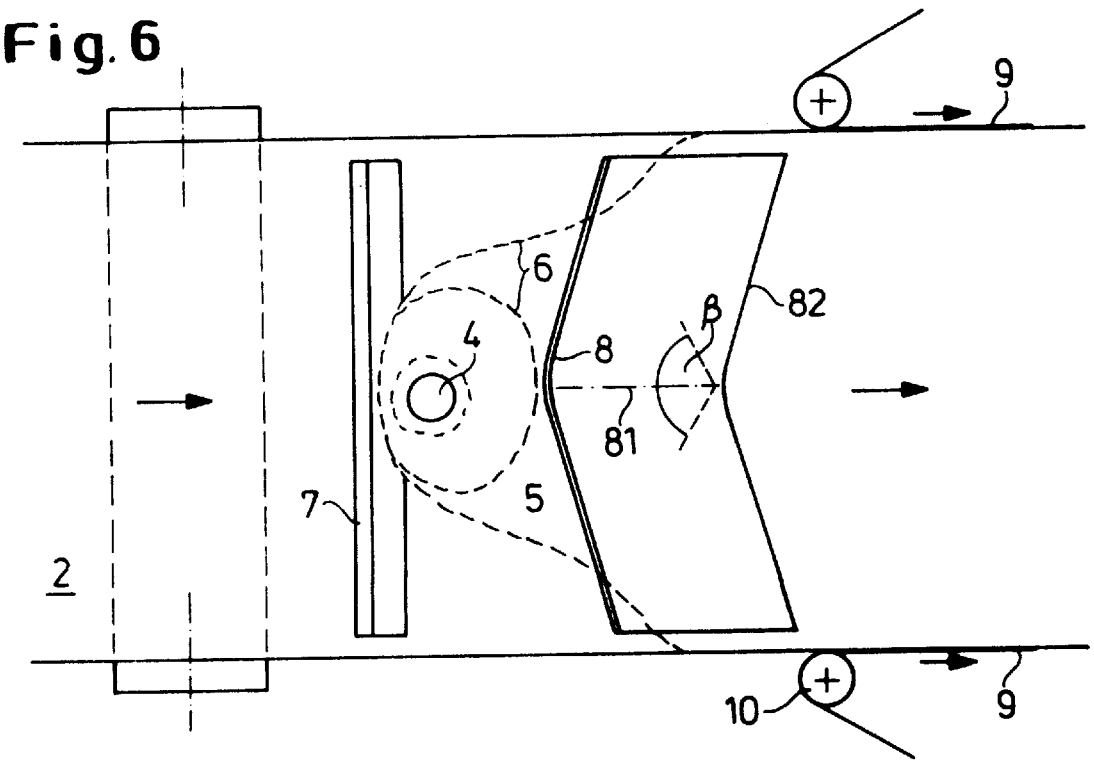
FIG. 6 shows a top view of the apparatus of FIG. 5.

FIGS. 5 and 6 show representations corresponding to FIGS. 1 and 2, wherein the distribution element 8 is wedge-shaped. The ridge 81 of the wedge preferably forms an angle $\alpha$ of 40 to 60° to the parallel relative to the conveyor belt center line. The dihedral angle $\beta$ (FIG. 6) is preferably 120 to 150°. The edge 82 facing the conveyor belt of the distribution element 8, which is the reverse edge relative to the liquid foam feed, forms a slot of constant width with the conveyor belt.

Figure 7:
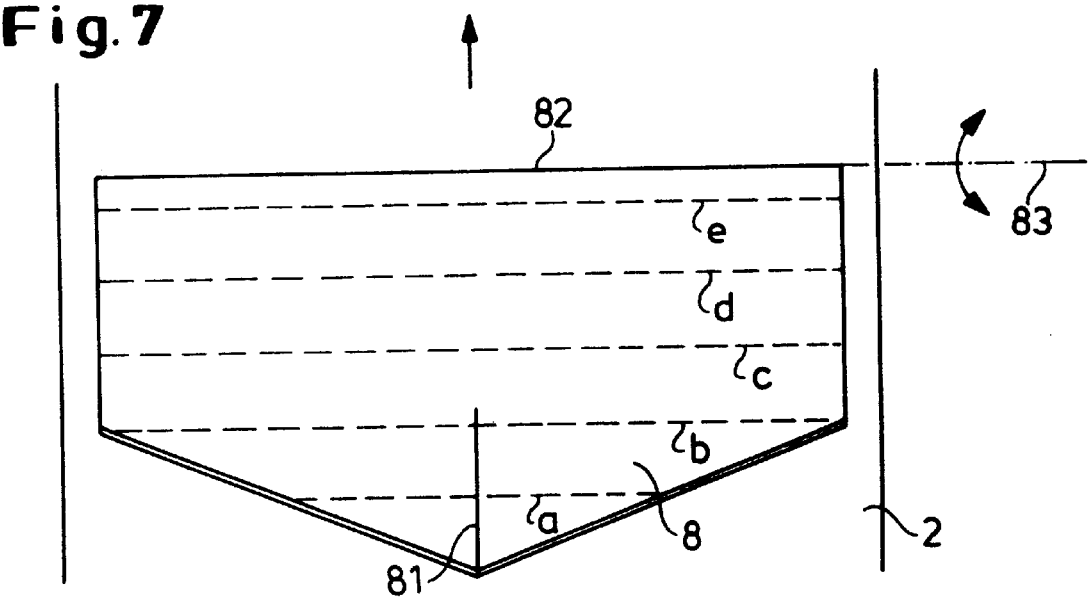
FIG. 7 shows a top view of another embodiment of the transverse distribution element.
Figure 8:
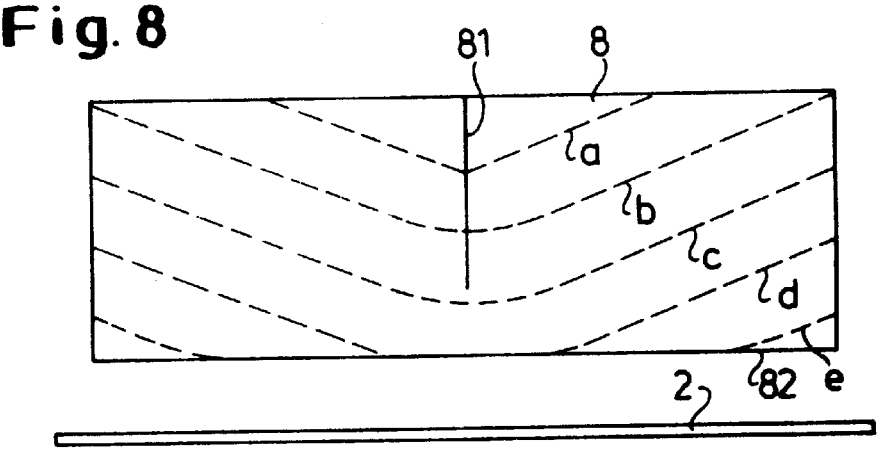
FIG. 8 shows a view of the distribution element of FIG. 7 wherein the projection is in the direction of the conveyor belt direction.

FIGS. 7 and 8 show a particularly preferred transverse distribution element 8, wherein FIG. 7 is a top view and FIG. 8 is a projection in the conveyor belt direction. The dashed lines a to e show isopositional lines transverse relative to the conveyor belt direction. On the inlet side, the liquid foam comes into contact with the ridge 81 of the wedge-shaped transverse distribution element 8. In the preferred embodiment, the outlet edge 82 is shown as a straight line extending transversely relative to the conveyor belt. The distribution element 8 is preferably pivotal around an axis 83, to facilitate adjustment in order to achieve optimum transverse distribution of the liquid foam. The transverse distribution element 8 may also be adjusted in height with regard to its distance from the conveyor belt on a mounting which is not shown.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the continuous production of polyurethane slabstock foam comprising the step of applying a polyurethane reactive mixture in the form of a liquid foam from a substantially rotationally symmetrical source onto the conveyor belt of a slabstock foam plant and distributing the liquid foam transversely across the width of the conveyor belt by a distribution device arranged above the conveyor belt, thereby forming a distribution slot, wherein said distribution device is in the form of a plate, the surface of said plate comprising a material which has self-releasing properties towards the polyurethane reactive mixture, wherein said plate is arranged obliquely at an angle of 20 to 60° relative to the conveyor belt center line, wherein the portion of said plate upstream of said conveyor belt is further away from said conveyor belt and the portion of said plate downstream of said conveyor belt is closer to said conveyor belt.

2. A process according to claim 1, wherein the distribution device is wedge-shaped on the liquid foam feed side, wherein the ridge of said wedge shaped distribution device extends in the central plane of the conveyor belt and, in the direction of the conveyor belt, converges therewith.

3. A process according to claim 1, wherein the outlet side of said distribution slot is formed by a line parallel to the conveyor belt extending transversely across the conveyor belt.

4. A process according to claim 1, wherein said distribution device is arranged pivotally around an axis above and perpendicular to the conveyor belt.

5. A process according to claim 1 wherein said distribution device may be adjusted in height relative to said conveyor belt.

* * * * *